United States Patent
Gross et al.

(10) Patent No.: US 10,699,068 B2
(45) Date of Patent: Jun. 30, 2020

(54) DISTRIBUTION OF LAMBDA FUNCTIONS

(71) Applicant: Microsoft Technology Licensing, LLC, Redmond, WA (US)

(72) Inventors: Christopher John Gross, Seattle, WA (US); Johnny Campbell, Woodinville, WA (US); Claudio Vittorio Russo, Girton (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/024,598

(22) Filed: Jun. 29, 2018

(65) Prior Publication Data

US 2020/0004812 A1    Jan. 2, 2020

(51) Int. Cl.
*G06F 17/00* (2019.01)
*G06F 40/18* (2020.01)
*G06F 40/123* (2020.01)

(52) U.S. Cl.
CPC ............ *G06F 40/18* (2020.01); *G06F 40/123* (2020.01)

(58) Field of Classification Search
CPC .................................................. G06F 17/246
See application file for complete search history.

(56) References Cited

U.S. PATENT DOCUMENTS

| | | |
|---|---|---|
| 2002/0118221 A1 | 8/2002 | Hudson et al. |
| 2004/0103366 A1* | 5/2004 | Peyton-Jones ........ G06F 17/246 715/213 |
| 2007/0244672 A1 | 10/2007 | Kjaer |
| 2009/0276482 A1 | 11/2009 | Rae et al. |
| 2009/0319542 A1 | 12/2009 | Le brazidec et al. |
| 2010/0261526 A1 | 10/2010 | Anderson et al. |
| 2011/0289396 A1 | 11/2011 | Oh |
| 2012/0191642 A1 | 7/2012 | George |
| 2013/0067305 A1* | 3/2013 | Golan ................... G06F 17/246 715/219 |
| 2013/0179764 A1 | 7/2013 | Battagin et al. |
| 2015/0309980 A1 | 10/2015 | Glass et al. |
| 2017/0084197 A1 | 3/2017 | Crouse et al. |
| 2017/0228358 A1 | 8/2017 | Hirzel et al. |
| 2018/0157468 A1 | 6/2018 | Stachura |
| 2018/0295194 A1 | 10/2018 | Deraz et al. |
| 2020/0004799 A1 | 1/2020 | Gross et al. |
| 2020/0004811 A1 | 1/2020 | Gross et al. |

OTHER PUBLICATIONS

"Notice of Allowance Issued in U.S. Appl. No. 16/024,566", dated Jul. 31, 2019, 8 Pages.

(Continued)

*Primary Examiner* — Scott T Baderman
*Assistant Examiner* — Barbara M Level

(57) ABSTRACT

In non-limiting examples of the present disclosure, systems, methods and devices for interacting with lambda functions are presented. An indication to store a lambda function may be received. The lambda function may comprise: executable information that is specific to a first spreadsheet application instance, executable information that is generic to spreadsheet application instances, and metadata describing the functionality of the lambda function. The lambda function may be stored, and an indication to apply the stored lambda function to data in a separate spreadsheet application instance may be received. The stored lambda function may be provided to the separate spreadsheet application instance for execution.

20 Claims, 10 Drawing Sheets

(56) References Cited

OTHER PUBLICATIONS

"Non Final Office Action Issued in U.S. Appl. No. 16/024,556", dated Oct. 11, 2019, 16 Pages.

Cortes, et al., "User-Defined Functions in Spreadsheets", In Masters Thesis Submitted in Software Development IT University of Copenhagen, Sep. 2006, 119 Pages.

"International Search Report and Written Opinion Issued in PCT Application No. PCT/US2019/037833", dated Oct. 2, 2019, 12 Pages.

"International Search Report and Written Opinion Issued in PCT Application No. PCT/US2019/037837", dated Oct. 2, 2019, 12 Pages.

"International Search Report and Written Opinion Issued in PCT Application No. PCT/US2019/037840", dated Oct. 2, 2019, 12 Pages.

"International Search Report and Written Opinion Issued in PCT Application No. PCT/US2019/037412", dated Oct. 28, 2019, 11 Pages.

Sestoft, Peter, "Online Partial Evaluation of Sheet-Defined Functions", In Electronic Proceeding in Theoretical computer Science, vol. 129, Sep. 19, 2013, pp. 136-160.

Sestoft, et al., "Sheet-Defined Functions: Implementation and Initial Evaluation", In Proceeding of International Symposium End-User Development, Jun. 10, 2013, pp. 88-103.

"Non Final Office Action Issued in U.S. Appl. No. 16/024,580", dated Jan. 13, 2020, 13 Pages.

"Final Office Action Issued in U.S. Appl. No. 16/024,556", dated Feb. 26, 2020, 17 Pages.

\* cited by examiner

DISTRIBUTION OF LAMBDA FUNCTIONS

CROSS REFERENCE TO RELATED APPLICATIONS

This application is related to co-pending U.S. patent application Ser. No. 16/024,556, entitled "RENDERING LAMBDA FUNCTIONS IN SPREADSHEET APPLICATIONS," U.S. patent application Ser. No. 16/024,580, entitled "AUTOMATICALLY CREATING LAMBDA FUNCTIONS IN SPREADSHEET APPLICATIONS," and U.S. patent application Ser. No. 16/024,566, entitled "CREATING AND HANDLING LAMBDA FUNCTIONS IN SPREADSHEET APPLICATIONS," all of which were filed on the same day as this application, the contents of which are all expressly incorporated by reference herein.

BACKGROUND

Spreadsheet applications such as, for example, Microsoft Excel®, are widely used in many fields and are increasingly important for analyzing data in today's business and computing environments. For example, data analysts use spreadsheet applications as tools for performing spreadsheet tasks including, but not limited to, consolidating and massaging data, producing charts, performing complex calculations, and the like.

The analysis on data input into spreadsheets is often complex. For example, it is not uncommon for spreadsheets to contain hundreds or thousands of formulae. These spreadsheets often comprise purely-functional programs that lack modularity, rely on copy/paste duplication (of formulae, of whole workbooks), utilize little or naming, and are otherwise extremely burdensome to create and maintain.

User Defined Functions (UDFs) are supported by many spreadsheet applications and generally address the problems above. Unfortunately, utilizing UDF functionality in today's spreadsheet applications can be extremely complex and time consuming as users must learn at least one programming language, e.g., Visual Basic for Applications (VBA), C++, JavaScript, etc., to code and update the UDFs. Additionally, scalability and cross-platform portability can become an issue due to the lack of native support for UDFs.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for interacting with lambda functions in spreadsheet applications. In some examples, a lambda store service may be utilized to store lambda functions created by users. The lambda functions provided to the lambda store service may be accessible by one or more users, and the lambda functions may be applied in one or more spreadsheet application instances. In some examples, when a user initiates the save of a lambda function with the lambda store service, the user may add metadata that is associated with the lambda that describes the functionality of the lambda, and which may be utilized when the creating user and/or other users search the lambda store for lambda functions to apply in their spreadsheet application instances.

A lambda function that is saved to a lambda store for later application in one or more spreadsheet application instances may comprise computer executable information that is specific to the spreadsheet application instance in which it was created, computer executable information that is generic to spreadsheet applications, and/or metadata describing the functionality of the lambda function (which may be user-created or automatically associated with the lambda function by the spreadsheet application and/or lambda store service). In some examples, the lambda store service may remove information that is spreadsheet application instance-specific from a lambda function that is to be stored in a lambda store prior to its storage/registry with the lambda store. The lambda store service may also replace that spreadsheet application instance-specific information with a generic placeholder and/or a prompt that describes what information to include in that portion of the lambda function so that it will appropriately be applied in a separate spreadsheet application instance.

BRIEF DESCRIPTION OF THE DRAWINGS

Non-limiting and non-exhaustive examples are described with reference to the following figures.

DETAILED DESCRIPTION

Figure 1:
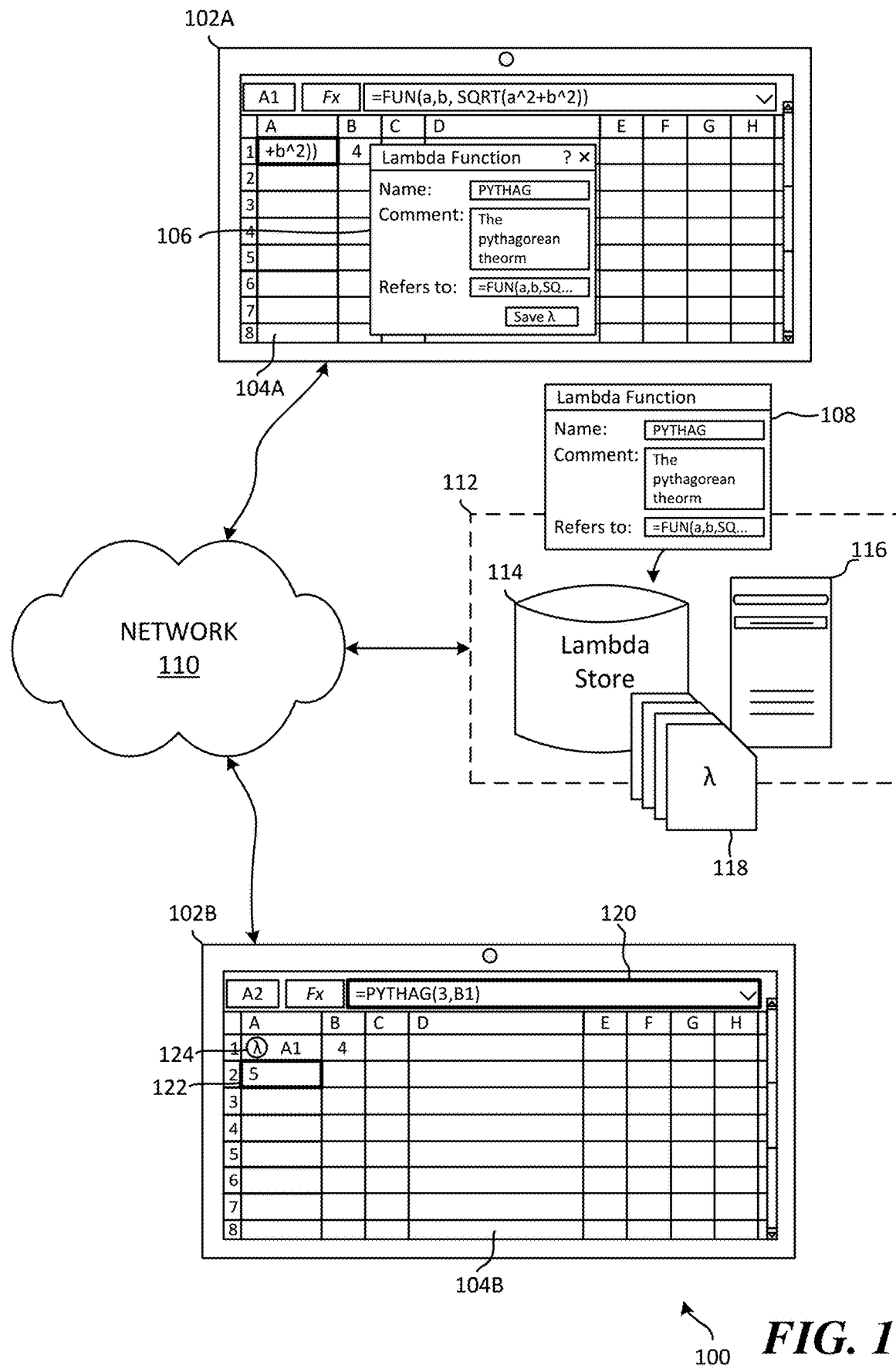
FIG. 1 is a schematic diagram illustrating an example distributed computing environment for storing a lambda created in a spreadsheet application instance and executing the stored lambda function on data in a spreadsheet application instance.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for interacting with lambda functions in spreadsheet applications. Technology is disclosed herein for creating and handling lambdas (or lambda functions) in spreadsheet applications. As discussed herein, lambdas are user (or custom) defined functions (UDFs) that are natively creatable within a cell of a spreadsheet and maintainable within a spreadsheet application using a lambda registry. The function syntax can have one or more arguments including one or more optional parameters followed by a function definition (also referred to as the function body or formula). Once defined, a lambda function can be invoked, and the formula applied like other first-class functions.

In some implementations, the spreadsheet application can detect expressions that define a lambda function and register the lambda function with the lambda registry. The registration can include recording a number of fields including a home cell that identifies a location of the spreadsheet where the lambda function is defined. Other fields can include identifier field (ID), Name, function body (or formula) fields, etc. In some implementations, a lambda registry can be created and associated with each workbook (or spreadsheet file). As discussed herein, each workbook (or spreadsheet file) includes one or more sheets (or spreadsheet grids). The lambda functions are then invoked by reference to the home cell or reference to a name of the lambda function.

Various technical effects are enabled by the techniques discussed herein. For example, the techniques enable users to more easily create and define lambdas (or lambda functions) within a spreadsheet application using spreadsheet formula syntax (or language). Moreover, because lambdas are functions which can act like data, the lambda functions enable recursion within a spreadsheet application, e.g., by the function calling itself. In addition to the clear ease of use and functional improvements to spreadsheet applications, native support for the lambda functions can also improve scalability and portability of these spreadsheets that utilize UDFs.

FIG. 1 is a schematic diagram illustrating an example distributed computing environment 100 for storing a lambda created in a spreadsheet application instance and executing the stored lambda function on data in a spreadsheet application instance. Distributed computing environment 100 includes computing device 102A, which may be the same computing device as computing device 102B or a different computing device as computing device 102B, network 110, and lambda store and processing sub-environment 112. Any and all of the computing devices in distributed computing environment 100 may communicate with one another via network 110.

Computing device 102A is executing an instance of spreadsheet application instance 104A, in which a user has entered an explicit lambda function into cell A1. The lambda function entered in cell A1 is an explicit lambda function rather than an implicit/implied lambda function because the parameters/variables (i.e., "a, b") and body (i.e., "SQRT (a^2+b^2)") are preceded with the outer function name "FUN". In contrast, an implicit lambda function comprises an outer function name string other than "FUN" (e.g., "FILTER", "SUM", "SUMIF", "SORT"). In some examples, an implicit lambda function may comprise one or more overloaded variables (e.g., [A1:A7, LEN(# a)-LEN(# b)]; [A1:A7, ISEVEN(# item)]), in the body. The lambda function entered in cell A1 is "=FUN(a,b, SQRT (a^2+b^2))", which is the Pythagorean theorem.

Pop-up window 106 is overlaid spreadsheet application instance 104A. Pop-up window 106 provides a mechanism for creating and registering a new lambda function with a lambda store. Specifically, pop-up window 106 includes a naming element where a user may provide a name for calling and identifying the newly created lambda function, a comment element where a user may provide comments describing the functionality or other information about the newly created lambda function, a "refers to" element, which includes the full string for the newly created lambda function, and a selectable "save λ" element for initiating the save of the lambda function with lambda store 114. In some examples, pop-up window 106 may automatically be presented by the spreadsheet application when a user enters a lambda function and/or an implicit lambda function in a cell of the spreadsheet application. In other examples, pop-up window 106 may only be presented by the spreadsheet application after a user has interacted with the spreadsheet application and indicated that the user would like to register a new lambda function.

Lambda store 114 provides storage for a plurality of lambda functions 118 executable by spreadsheet applications. The plurality of lambda functions 118 may comprise lambda functions created by one or more users and/or "out of the box" lambda functions that are preloaded with a spreadsheet application. In some examples, lambda store 114 in conjunction with one or more computing devices, such as server computing device 116, may comprise a lambda store service, which may be remotely accessible by a plurality of computing devices and spreadsheet application instances. In additional examples the lambda store service may be included as part of each spreadsheet application (i.e., each device that executes a spreadsheet application has a separate lambda store service). In other examples, each computing device associated with a spreadsheet application may have its own lambda store included therein.

Upon receiving an indication to save the PYTHAG lambda function (e.g., receiving a selection of the "save λ" icon), the PYTHAG lambda function may be saved to lambda store 114 as one of the plurality of lambda functions 118. The newly created lambda function may be saved to lambda store with metadata describing it, which may be taken from the elements included in pop-up window 106. For example, the metadata describing the newly created lambda function may include the lambda's name, user comments describing the lambda function, and the full string for the newly created lambda function. In some examples, the lambda store service may analyze newly created lambdas for inclusion of executable information that is specific to the spreadsheet application instance in which the lambda function was created (e.g., a reference to at least one cell in a spreadsheet application instance, a reference to a sheet in a spreadsheet application instance, a reference to specific values in a spreadsheet application instance), and/or executable information that is generic to spreadsheet application instances (e.g., variables, conditions, functions). In some examples, upon identifying information that is specific to the spreadsheet application instance in a lambda function that is to be registered, the lambda store service may replace that information with a generic placeholder that can be filled in by users to fit their own spreadsheet application data. For example, if the lambda store service identifies a specific cell range in a lambda function (e.g., A1:A7) to be sorted as part of a lambda function, the lambda store service may replace that specific range with a generic RANGE placeholder which users of the lambda function may populate with a range that they would like to apply the lambda function to in their spreadsheet application instance.

Spreadsheet application instance 104B is the same spreadsheet application instance as spreadsheet application instance 104A; However, it should be understood that the systems, methods, and devices described herein can distribute stored lambda functions for execution in separate spreadsheet application instances. In spreadsheet application instance 104B, a lambda function icon 124 has replaced the newly created PYTHAG lambda function. Additionally, a user of spreadsheet application instance 104B has called the newly created PYTHAG lambda function from lambda store 114, by entering the string "=PYTHAG(3,B1)" in cell A2 122, which can be seen in display element 120. As such, the newly created PYTHAG lambda function has been applied to the specific values corresponding to parameters "a,b" in the newly created PYTHAG lambda function. Specifically, the input value of "3" has been substituted for the "a" parameter, and the value in cell B1 (i.e., "4") has been substituted for the "b" parameter. As such, the result of the PYTHAG lambda function applied in cell A2 is "5" (i.e., SQRT(3^2+4^2)).

Figure 2A:
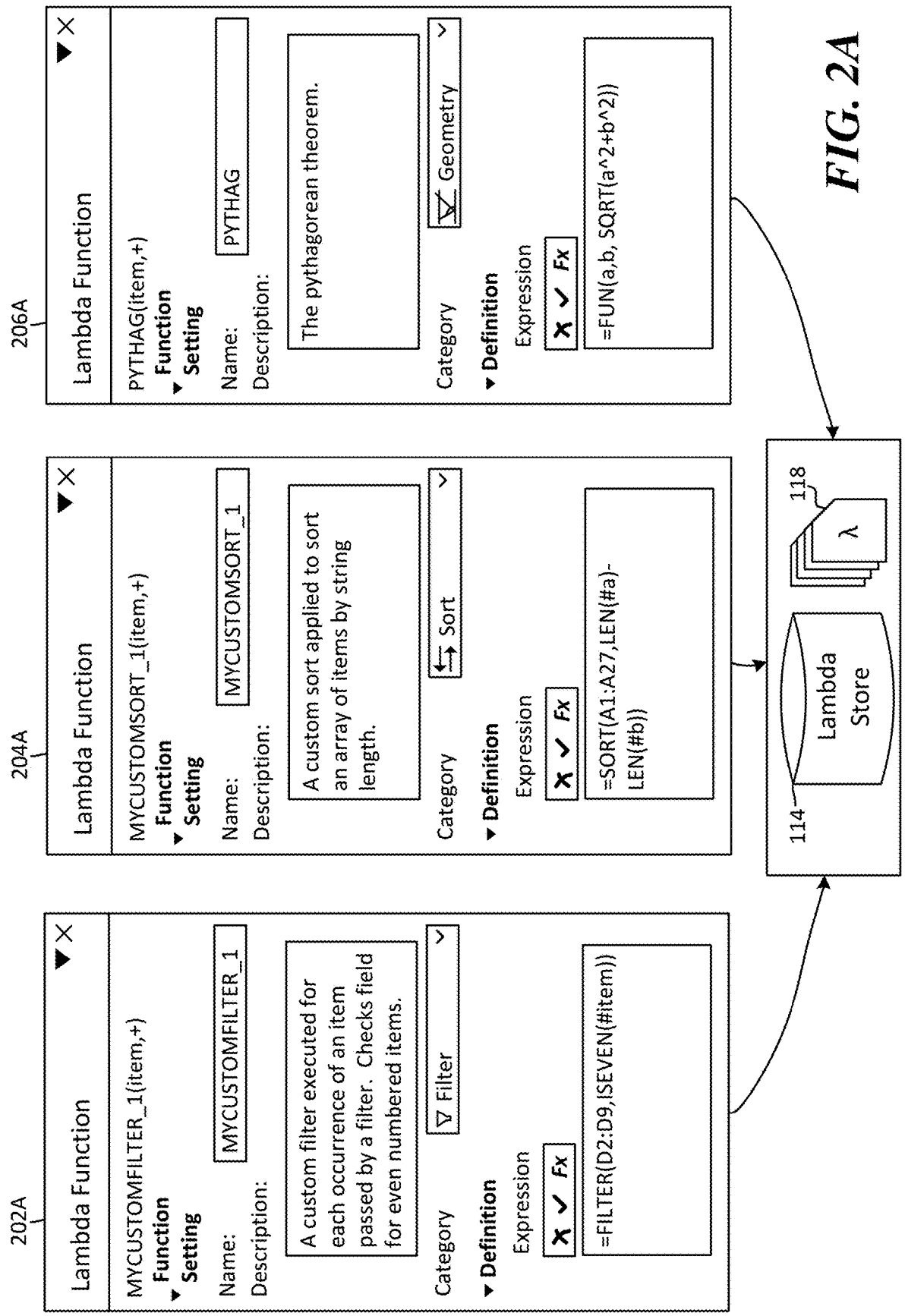
FIG. 2A illustrates three exemplary user interface elements for registering three separate spreadsheet lambda functions with a lambda store.

FIG. 2A illustrates three exemplary user interface elements (202A, 204A, 206A) for registering three separate spreadsheet lambda functions with a lambda store 114 comprising a plurality of registered lambda functions 118. In some examples, the lambda store 114 and the plurality of registered lambda functions 118 may be accessed remotely from computing devices registering the lambda functions (i.e., accessed in the cloud). In other examples, the lambda store 114 and the plurality of registered lambda functions 118 may be comprised on the same computing devices as those from which the lambda functions are being registered. In some examples, each of the user interface elements shown in FIG. 2A may be automatically displayed by a spreadsheet application upon the spreadsheet application receiving a string input of a lambda function or an implied lambda function. In other examples, each of the user interface elements shown in FIG. 2A may only be displayed by a spreadsheet application upon a user selecting, from a spreadsheet application user interface, an option to register a new lambda function with a lambda store, lambda store service, and/or spreadsheet application.

First user interface registration element 202A provides a mechanism for a user to register a lambda function. In this example, the lambda function that is being registered is a filter function. The filter function being registered is "=FILTER(D2:D9,ISEVEN(# item))". This exemplary function may be called by the MYCUSTOMFILTER_1 name to filter out the odd numbered rows specified in the lambda function's range (in this specific application instance the specified range is D2:D9). However, in other application instances, if called, the lambda function may include a generic placeholder for the range, which can be filled in by a user interacting with the other application instances. This provides flexibility to other users who may wish to utilize the registering user's filter lambda function from a shared lambda store, such as lambda store 114, but those users can apply the filter function to their own range, which is made easier by the replacement of the creating user's range with a generic placeholder, which may be highlighted and/or provide a prompt to users to fill it in with their own range. Additional description regarding replacement of ranges with generic placeholders is shown with reference to FIG. 2B.

In this example, the filter function that is being registered via user interface registration element 202A is an implied lambda function because the function name is "FILTER" rather than "FUN", and it includes an overloaded variable (i.e., "# item"). First user interface registration element 202A provides input elements for including a name of the filter lambda function, a description of the filter lambda function, a category type selection element to classify the filter lambda function, and a definition element for including the full string for the filter lambda function. In some examples, the definition element may be automatically filled in when a user has selected the cell in which the lambda function to be created resides. In this example, the name element has been filled in with the name "MYCUSTOMFILTER_1", the description element has been filled in with the description: "A custom filter executed for each occurrence of an item passed by a filter. Checks field for even numbered items." The category type selection element has been set to "Filter", and the definition element includes the full expression "=FILTER(D2:D9,ISEVEN(# item))".

Like first user interface registration element 202A, second user interface registration element 204A provides a mechanism for a user to register another exemplary lambda function. In this example, the lambda function that is being registered utilizing second user interface registration element 204A is a sort function. The sort function being registered is "=SORT(A1:A27,LEN(# a)-LEN(# b))". This exemplary function may be called by the MYCUSTOMSORT_1 name to sort an array of items by string length (e.g., sorting words in an array by the number of letters in each word). In this example the specified range for the lambda function to which the function will be applied is A1:A27. However, in other application instances, if called, the lambda function may include a generic placeholder for the range, which can be filled in by a user interacting with other application instances. This provides flexibility to other users who may wish to utilize the registering user's sort lambda function from a shared lambda store, such as lambda store 114, but those users can apply the sort function to their own range, which is made easier by the replacement of the creating user's range with a generic placeholder, which may be highlighted and/or provide a prompt to users to fill it in with their own range that they would like to sort.

In this example, the sort function that is being registered via second user interface registration element 204A is an implied lambda function because the function name is "SORT" rather than "FUN", and it includes overloaded variables "(# a)" and "(# b)". Second user interface registration element 204A provides input elements for including a name of the sort lambda function, a description of the sort lambda function, a category type selection element to classify the sort lambda function, and a definition element for including the full string for the sort lambda function. In some examples, the definition element may be automatically filled in when a user has selected the cell in which the lambda function to be created resides in the spreadsheet application. In this example, the name element has been filled in with the name "MYCUSTOMSORT_1", the description element has been filled in with the description:

"A custom sort applied to sort an array of items by string length." The category type selection element has been set to "Sort", and the definition element includes the full expression "SORT(A1:A27,LEN(# a)-LEN(# b))".

Like first user interface registration element 202A and second user interface registration element 204A, third user interface registration element 206A provides a mechanism for a user to register another exemplary lambda function. In this example, the lambda function that is being registered utilizing third user interface registration element 206A is a mathematical function. The mathematical function being registered is "=FUN(a,b,SQRT(a^2+b^2))", which is the Pythagorean theorem. This exemplary function may be called by the PYTHAG name to apply the Pythagorean theorem to variables designated by a user. Users of the PYTHAG function may input numerical values to replace the variables of the function or cell references, which include values, to replace the variables of the function.

In this example, the mathematical function that is being registered via third user interface registration element 206A is an explicit lambda function because the function name is "FUN". Second user interface registration element 206A provides input elements for including a name of the mathematical function, a description of the mathematical lambda function, a category type selection element to classify the mathematical lambda function, and a definition element for including the full expression for the sort lambda function.

According to some examples, the lambda store 114 may associate the information in each of the populated fields from the lambda function registration elements as searchable metadata with each corresponding lambda function. By doing so, users may use keyword searches which can be matched against metadata for stored/registered lambda functions in lambda store 114. According to additional examples, the lambda store 114 may classify each stored/registered lambda function based, at least in part, on the metadata associated with each lambda function. In some examples, the definition element may be automatically filled in when a user has selected the cell in which the lambda function to be created resides in the spreadsheet application. In this example, the name element has been filled in with the name "PYTHAG", the description element has been filled in with the description: "The pythagorean theorem." The category type selection element has been set to "Geometry", and the definition element includes the full string "=FUN(a,b,SQRT (a^2_b^2)).

Figure 2B:
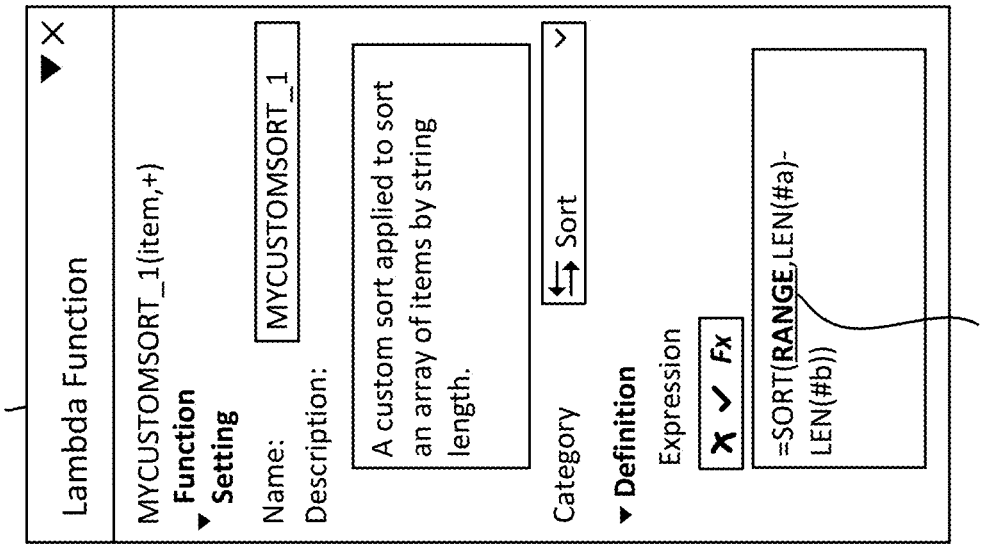
FIG. 2B illustrates two exemplary user interface elements for registering two spreadsheet lambda functions with a lambda store, which have had user-specific ranges removed from the functions.
Figure 2B:
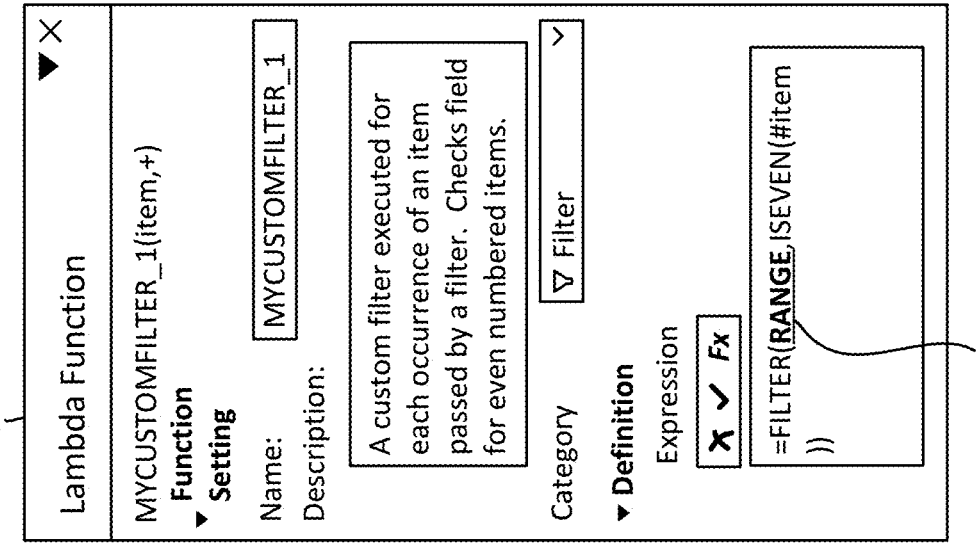

FIG. 2B illustrates two exemplary user interface registration elements (202B and 204B) for registering two spreadsheet lambda functions with a lambda store. In this example, first user interface registration element 202B is being utilized to register the same filter lambda function as was described in relation to first user interface registration element 202A in FIG. 2A, except in the "definition" element of first user interface registration element 202B, the lambda store service has automatically replaced the range in the filter expression specified by the creating user, with a generic "RANGE" element 203B that provides flexibility for other users to apply the filter function to their own ranges and spreadsheet data. That is, when a subsequent user accesses MYCUSTOMFILTER_1 from the lambda store, the user can interact with generic "RANGE" element 203B and fill it in with the range in their spreadsheet that the user would like to filter with the lambda function, rather than having the lambda function applied to a range of cells that the creating user of MYCUSTOMFILTER_1 designated.

Similarly, second user interface registration element 204B is being utilized to register the same sort lambda function as was described in relation to second user interface element 204A in FIG. 2A, except in the "definition" element of second user interface registration element 204A, the lambda store service has automatically replaced the range in the sort expression specified by the creating user, with a generic "RANGE" element 205B that provides flexibility for other users to apply the sort function to their own ranges and spreadsheet data. That is, when a subsequent user accesses MYCUSTOMSORT_1 from the lambda store, the user can interact with generic "RANGE" element 205B and fill it in with the range in their spreadsheet that the user would like to sort with the lambda function, rather than having the lambda function applied to a range of cells that the creating user of MYCUSTOMSORT_1 designated.

In other examples (not shown), a range of a lambda function that is specific to a registering/creating user, may be replaced with a generic range element after the registration of the lambda function has occurred. That is, the replacement of the generic range element may occur in the lambda store, and the generic "RANGE" element, rather than a range that was specific to the registering/creating user, may be surfaced on a subsequent user's spreadsheet application instance when the subsequent user utilizes a corresponding lambda function that has been registered with the lambda store.

Figure 3:
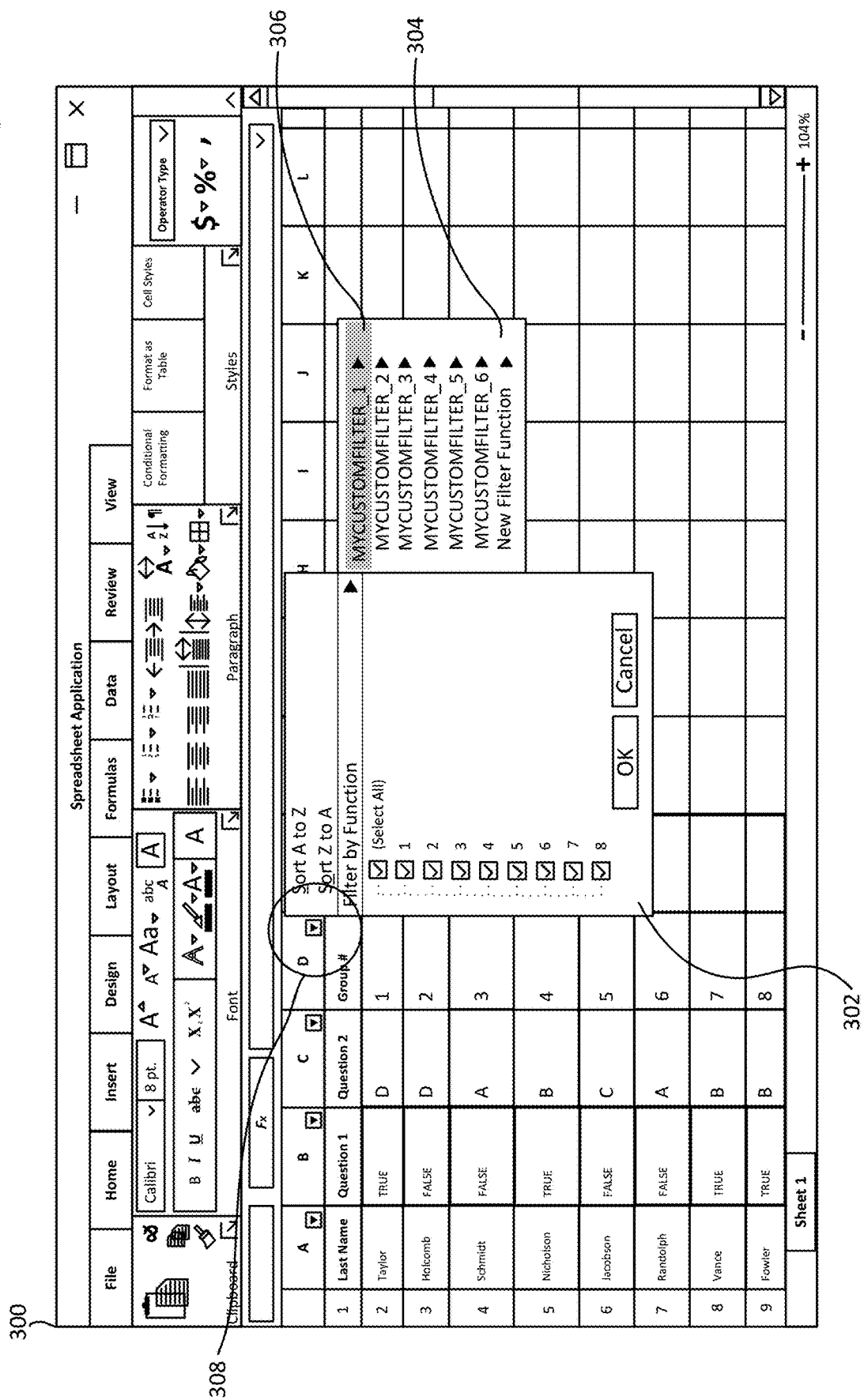
FIG. 3 illustrates an exemplary user interface for selecting a lambda function to execute in a spreadsheet application instance, from a plurality of lambda functions stored in a lambda store.

FIG. 3 illustrates an exemplary spreadsheet application user interface 300 for selecting a lambda function to execute in a spreadsheet application instance, from a plurality of lambda functions stored in a lambda store. In this example, a user may utilize selectable user interface elements in spreadsheet application instance to apply a lambda function from a lambda store to the user's spreadsheet application instance. The lambda store may reside on a same computing device as the computing device executing the spreadsheet application instance, or the lambda store may be accessed remotely.

In this example, a user has selected selectable user interface element 308, which causes pop-up window 302 to be surfaced on user interface 300. Pop-up window 302 includes selectable options for filtering column D in the spreadsheet application instance utilizing lambda filters from a lambda store. In this example, the user has indicated that the user would like to filter column D by function, and a plurality of selectable lambda filters are provided in fly-out window 304. The user has then selected the lambda filter MYCUSTOMFILTER_1 306. Upon selecting MYCUSTOMFILTER_1, the spreadsheet application instance may communicate with the lambda store, retrieve the selected lambda, and apply the filter function to column D. In this instance, MYCUSTOMFILTER_1 is a filter executable for filtering out odd numbered rows corresponding to column D.

Figure 4:
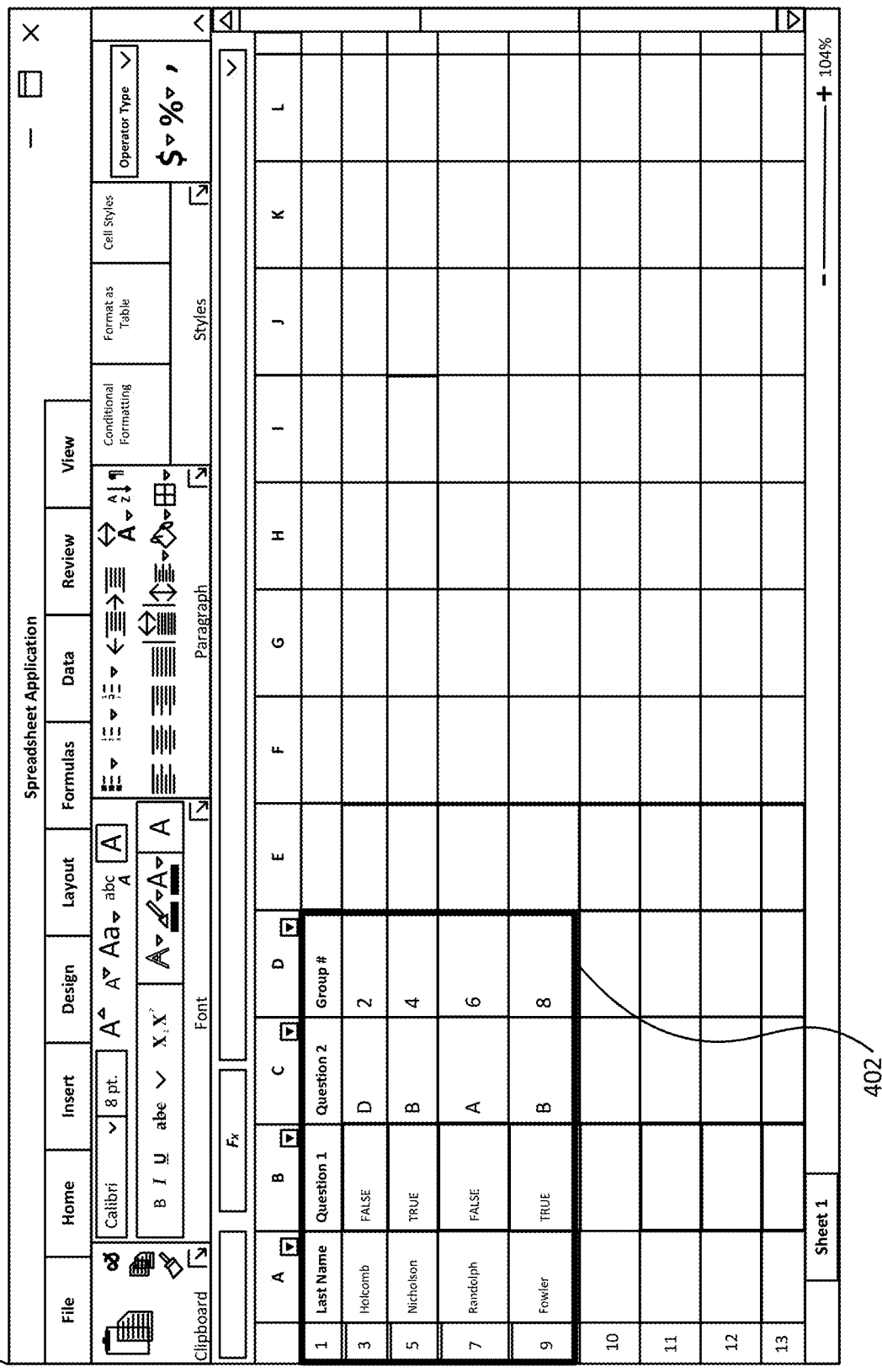
FIG. 4 illustrates a spreadsheet application user interface displaying the result of executing a lambda function selected from a plurality of lambda function stored in a lambda store.

FIG. 4 illustrates an exemplary spreadsheet application user interface 400 displaying the result of executing a lambda function selected from a plurality of lambda function stored in a lambda store. In this example, the lambda filter MYCUSTOMFILTER_1 was selected, the corresponding lambda function was identified in the lambda store, and the corresponding lambda function was applied to each row corresponding to an odd number in column D. As such, only the rows corresponding to even numbers in column D remain, as indicated in table 402. That is, while rows in the table originally were shown for groups 1 through 8 in the spreadsheet application instance, after the selected lambda filter is applied, only the rows corresponding to even numbered groups (i.e., group 2, group 4, group 6, and group 8) are still displayed in table 402, as each of the rows corresponding to odd numbered groups have been filtered out by the lambda function applied from the lambda store.

Figure 5:
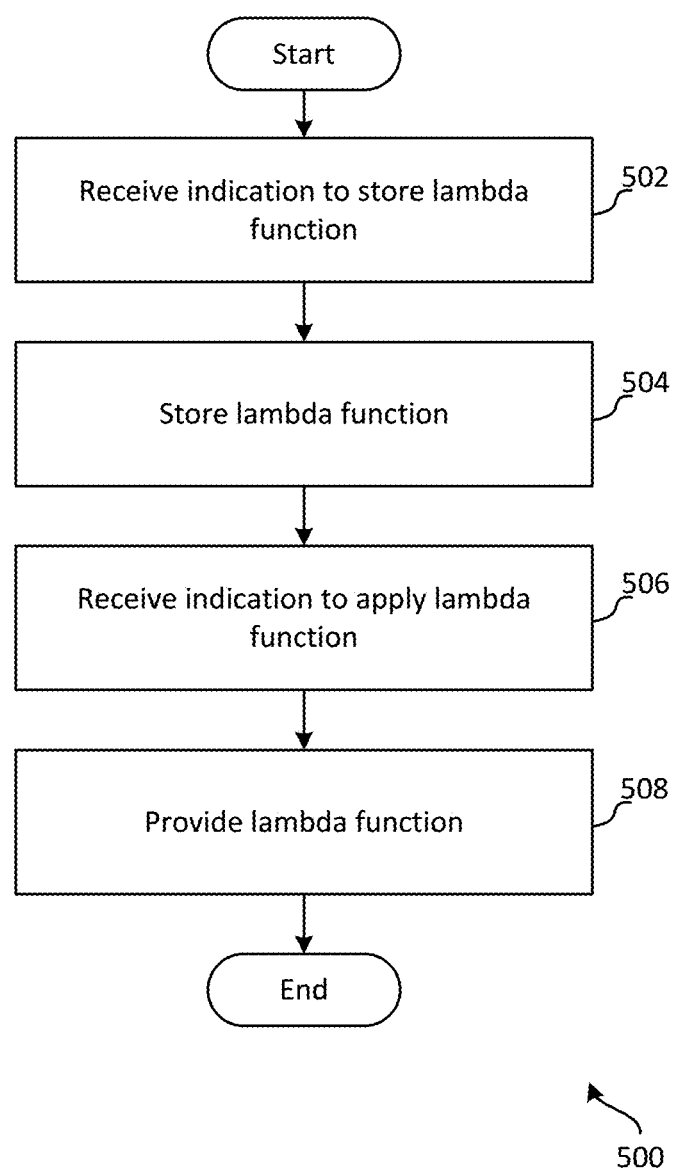
FIG. 5 is an exemplary method for interacting with lambda functions in spreadsheet applications.

FIG. 5 is an exemplary method 500 for interacting with lambda functions in spreadsheet applications. The method 500 begins at a start operation and flow continues to operation 502.

At operation 502 an indication to store a lambda function may be received. In some examples, the indication may be received automatically. In other examples, the indication may be received after manual input by a user. In an example, a spreadsheet application may receive a string comprising an implied or explicit lambda function, and upon receiving that string, the indication to store the lambda function may be received by the spreadsheet application and/or a lambda store service.

According to some examples, the lambda function may comprise computer executable information that is specific to a first spreadsheet application instance, wherein the first spreadsheet application instance is a spreadsheet application instance in which the lambda function was created, computer executable information that is generic to spreadsheet application instances, and/or metadata describing the functionality of the lambda function. The computer executable information that is specific to a first spreadsheet application instance may comprise one or more values, one or more cells, one or more cell references, one or more cell ranges, and/or one or more sheet references that reference content in the first spreadsheet application instance. The computer executable information that is generic to spreadsheet application instances may comprise a condition, function, and/or a formula. The metadata describing the functionality of the lambda function may be manually input by a user and/or automatically generated by the spreadsheet application and/or the lambda store service. The metadata may provide a custom name for the lambda function, a description of what the lambda function does upon its execution, the full string of the lambda function, the identity of the user that created the lambda function, and in some examples, working examples that illustrate how the lambda function may be applied.

From operation 502 flow continues to operation 504 where the lambda function is stored. The lambda function may be stored automatically after it is identified in the spreadsheet application, or it may be stored after a user has indicated to the spreadsheet application and/or the lambda function service that the lambda function is to be stored/registered with a lambda store. The stored lambda may be made accessible only to the creating user, to the creating user and other users that the creating user authorizes, and/or to any user that has access to the lambda store, which may reside on the creating user's computing device, or which may be maintained remotely.

From operation 504 flow continues to operation 506 where an indication to apply the stored lambda function to data in a separate spreadsheet application instance is received. The separate spreadsheet application instance may be an instance in the same workbook as the first spreadsheet application instance, but in a different sheet, in a different workbook, but a spreadsheet application associated with the same creating user, and/or a spreadsheet application that is associated with a user that is not the creating user. In some examples, the indication to apply the stored lambda function may be a typed string that identifies the stored lambda function in some manner (e.g., the full string of the lambda function, a name under which the lambda was stored, a reference number under which the lambda function was stored). In other examples, the indication to apply the stored lambda function may be an option selected from user interface elements of a spreadsheet application user interface. In still other examples, the indication to apply the stored lambda function may comprise a user searching for lambda functions and indicating that a surfaced lambda function result should be applied in the user's spreadsheet application instance.

From operation 506 flow continues to operation 508 where the stored lambda function is provided to the separate spreadsheet application instance. That is, the stored lambda function is caused to be applied or otherwise surfaced in the spreadsheet application instance from which the indication was received. The lambda function may then be automatically applied to data in the separate spreadsheet application instance, and the result of that function may be caused to be displayed on a user interface of the separate spreadsheet application instance.

From operation 508 flow continues to an end operation and the method 500 ends.

Figure 6:
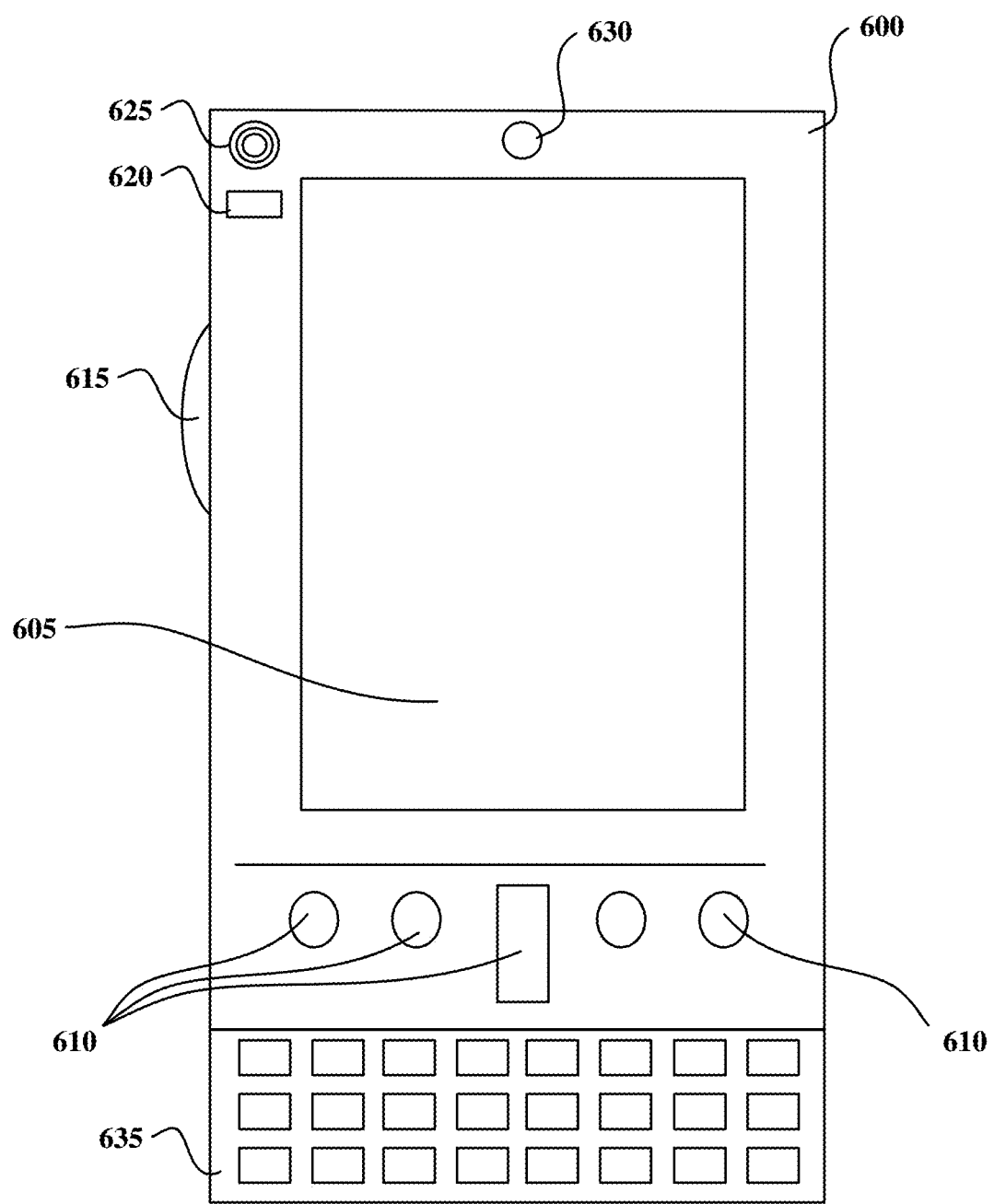
FIGS. 6 and 7 are simplified diagrams of a mobile computing device with which aspects of the disclosure may be practiced.
Figure 7:
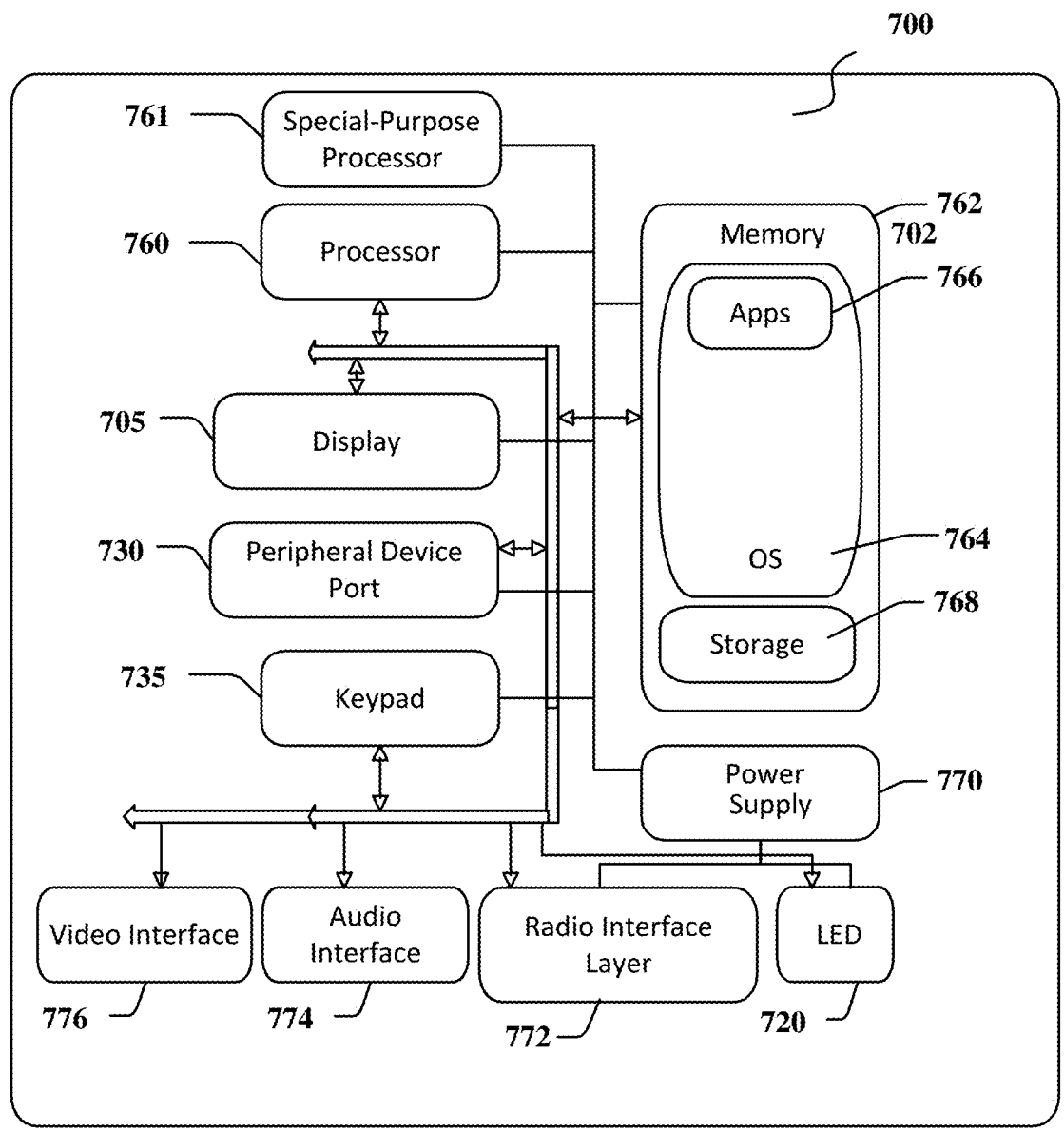

FIGS. 6 and 7 illustrate a mobile computing device 600, for example, a mobile telephone, a smart phone, wearable computer, a tablet computer, an e-reader, a laptop computer, and an augmented reality computer, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for identifying a target value in a data set.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
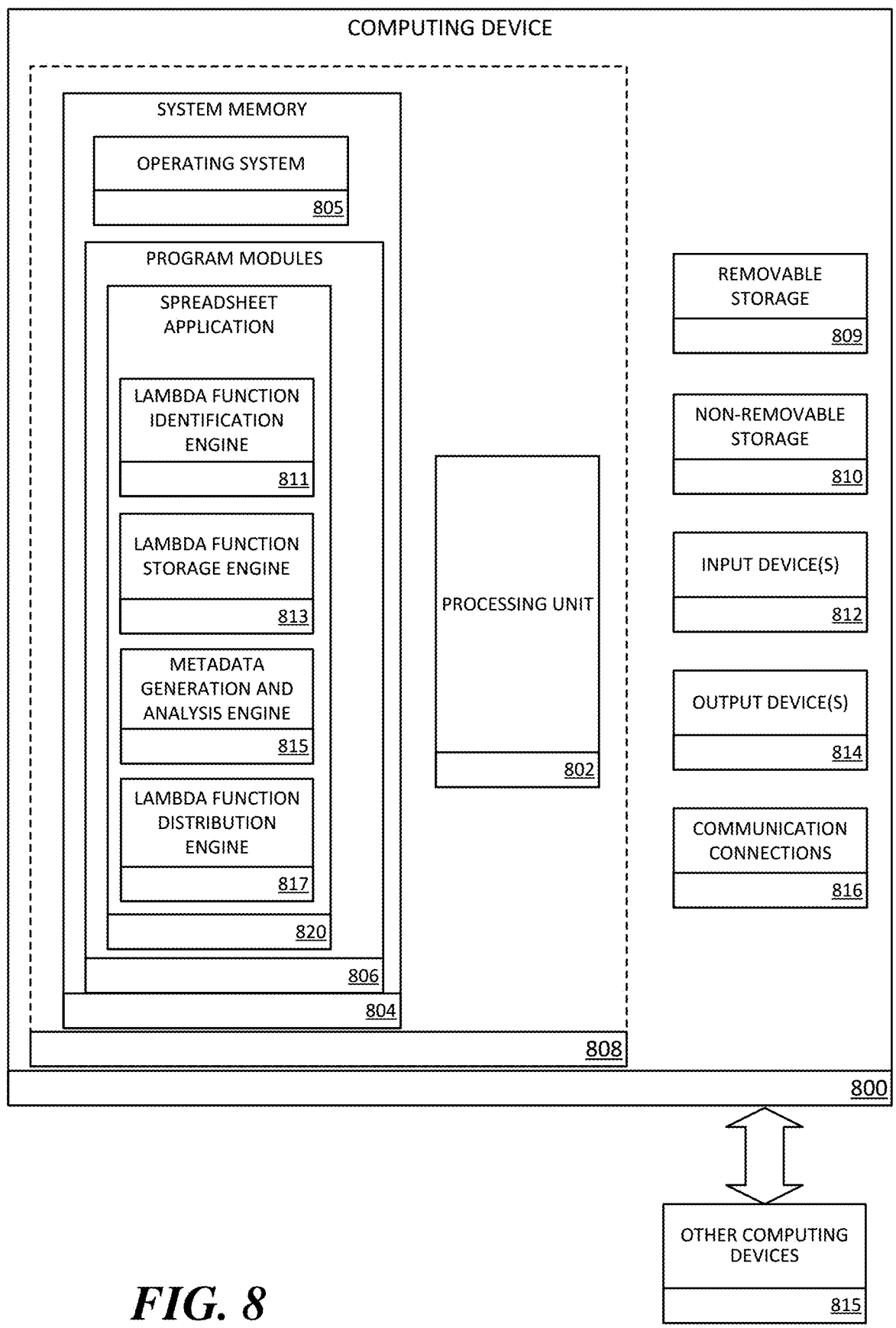
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with interacting with lambda functions in spreadsheet applications and lambda stores. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more spreadsheet applications and/or related productivity applications. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., spreadsheet application 820) may perform processes including, but not limited to, the aspects, as described herein. According to examples, lambda function identification engine 811 may perform one or more operations associated with identifying lambda functions and/or implied lambda functions in spreadsheet applications for storing in a lambda storage repository. Lambda function storage engine 813 may perform one or more operations associated with receiving lambda functions from spreadsheet applications, storing lambda functions from spreadsheet applications, identifying spreadsheet application instance-specific information in lambda functions, and replacing that information with generic information before distribution. Metadata generation analysis engine 815 may perform one or more operations associated with generating metadata for including with lambda functions stored in a lambda function repository and classifying lambda functions received from spreadsheet application instances into one or more categories for distribution. Lambda function distribution engine 817 may perform one or more operations associated with receiving an indication to execute lambda functions in a spreadsheet application instances and providing lambda functions for execution in spreadsheet application instances.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 815. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
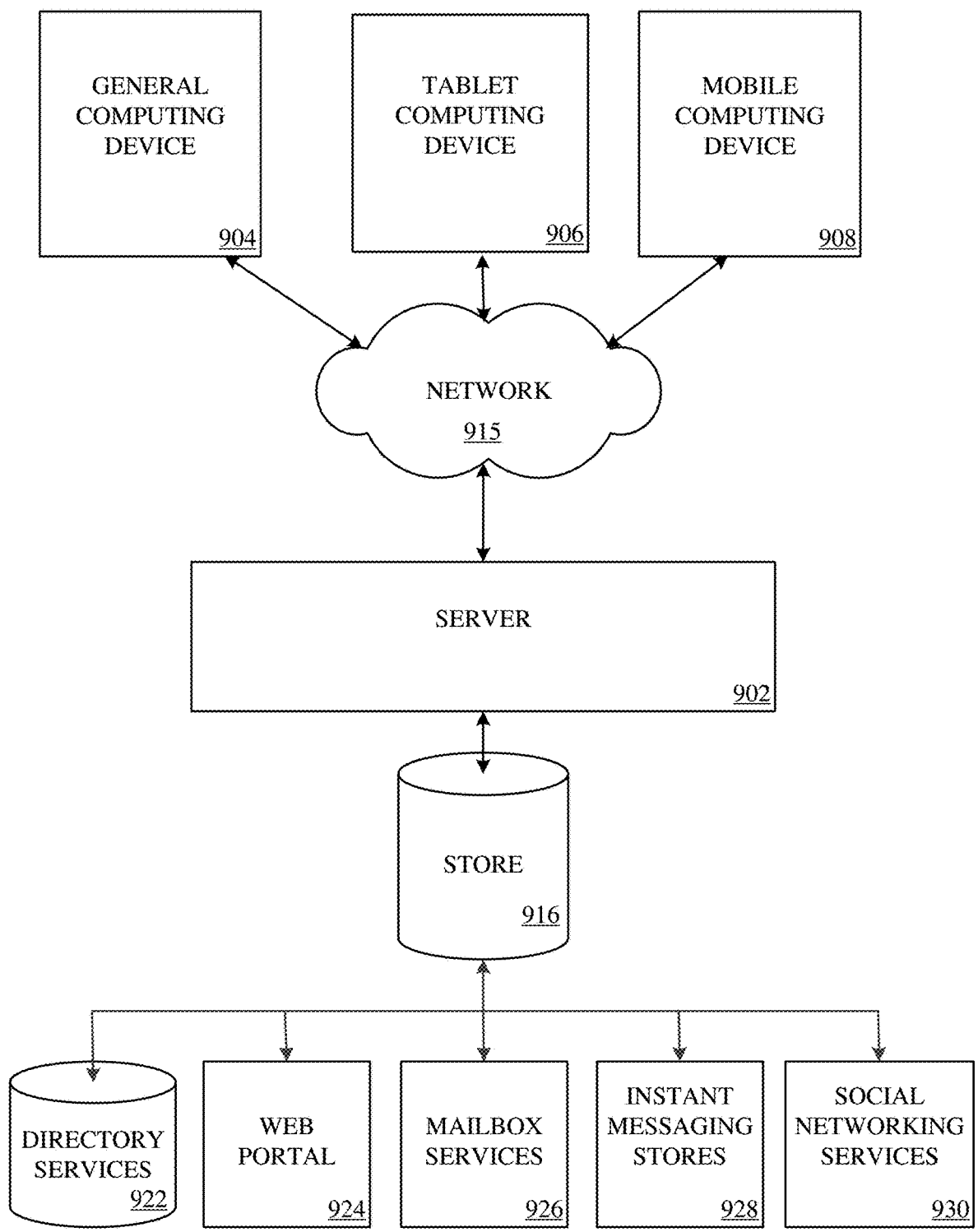
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide technical advantages for improving interaction with data associated with spreadsheet applications. The ability to create, store, and access user-created lambda functions according to the systems, methods and devices described herein provides a high degree of flexibility for users of spreadsheet applications that would otherwise be forced to create such functions using different computer languages, such as VBA, or apply long strings of spreadsheet-specific logic that require higher number of computing cycles to execute. For example, even the most basic conditional function, if repeated, would require double if not more computing cycles to execute than execution of a lambda function that could replace it according to the systems, methods and devices described herein. In addition to saving computing resources, storage costs associated with storing large strings of code necessary to execute custom functions are reduced, as the custom functions can be stored in smaller chunks due to implementation of lambda functions in the spreadsheet application setting. The user experience is also improved by allowing users to search a lambda store for custom functions that are user created and crowdsourced, thereby increasing the chances that users will have access to functions they would like to apply in spreadsheet applications, without having to wait for new functions to be rolled out in spreadsheet application releases, which can take years to come about, and sometimes only be accompanied by a handful of new functions.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for interacting with lambda functions in spreadsheet applications, the computer-implemented method comprising:
    receiving an indication to store a lambda function, wherein the lambda function comprises:
        a reference to a range of cells that includes a value that the lambda function is applied to in a first spreadsheet application instance, wherein the first spreadsheet application instance is a spreadsheet application instance in which the lambda function was created,
        computer executable information that is generic to spreadsheet application instances, and
        metadata describing the functionality of the lambda function,
    automatically replacing the reference to the range of cells with a generic placeholder that is selectable for adding a range of cells from a separate spreadsheet application instance;
    storing the lambda function;
    receiving an indication to apply the stored lambda function to data in the separate spreadsheet application instance;
    providing the stored lambda function to the separate spreadsheet application instance;
    receiving an indication of a selection of the generic placeholder in the separate spreadsheet application instance; and
    replacing the generic placeholder with a range of cells from the separate spreadsheet application instance.

2. The computer-implemented method of claim 1, wherein the computer executable information that is specific to the first spreadsheet application instance comprises a reference to at least one cell in the first spreadsheet application instance that contains data.

3. The computer-implemented method of claim 2, wherein the lambda function was applied, in the first spreadsheet application instance, to the data in the at least one cell.

4. The computer-implemented method of claim 1, wherein the computer executable information that is specific to the first spreadsheet application instance comprises a reference to a sheet in the first spreadsheet application instance that contains data.

5. The computer-implemented method of claim 4, wherein the lambda function was applied, in the first spreadsheet application instance, to data in the sheet in the first spreadsheet application instance.

6. The computer-implemented method of claim 1, wherein the computer executable information that is generic to spreadsheet application instances comprises at least one of: a condition, and a formula.

7. The computer-implemented method of claim 1, wherein the lambda function is stored in association with a plurality of lambda functions having a category type corresponding to the functionality described in the metadata.

8. The computer-implemented method of claim 1, wherein receiving the indication to store the lambda function comprises identifying, in the first spreadsheet application instance, a user-input expression comprising non-explicit syntax implicating a lambda function.

9. The computer-implemented method of claim 1, wherein receiving the indication to store the lambda function comprises identifying, in the first spreadsheet application instance, a user-input expression comprising explicit syntax implicating a lambda function.

10. The computer-implemented method of claim 1, wherein the separate spreadsheet application instance is a spreadsheet application instance in which the lambda function was not created.

11. The computer-implemented method of claim 1, wherein the lambda function is an implied lambda function.

12. The computer-implemented method of claim 1, wherein the metadata comprises working examples that illustrate how the lambda function may be applied.

13. A system for interacting with lambda functions in spreadsheet applications, the system comprising:
    a memory for storing executable program code; and
    one or more processors, functionally coupled to the memory, the one or more processors being responsive to computer-executable instructions contained in the program code and operative to:
        receive an indication to store a lambda function, wherein the lambda function comprises:
            a reference to a range of cells that includes a value that the lambda function is applied to in a first spreadsheet application instance, wherein the first spreadsheet application instance is a spreadsheet application instance in which the lambda function was created,
            executable information that is generic to spreadsheet application instances, and
            metadata describing the functionality of the lambda function,
        automatically replace the reference to the range of cells with a generic placeholder that is selectable for adding a range of cells from a separate spreadsheet application instance;

store the lambda function;

receive an indication to apply the stored lambda function to data in a separate spreadsheet application instance, provide the stored lambda function to the separate spreadsheet application instance receive an indication of a selection of the generic placeholder in the separate spreadsheet application instance; and replace the generic placeholder with a range of cells from the separate spreadsheet application instance.

14. The system of claim 11, wherein the separate spreadsheet application instance is a spreadsheet application instance in which the lambda function was not created.

15. The system of claim 11, wherein the executable information that is specific to the first spreadsheet application instance comprises a reference to at least one cell in the first spreadsheet application instance that contains the data.

16. The system of claim 11, wherein the executable information that is specific to the first spreadsheet application instance comprises a reference to a sheet in the first spreadsheet application instance that contains data.

17. The system of claim 11, wherein the lambda function is an implied lambda function.

18. The system of claim 11, wherein the metadata comprises working examples that illustrate how the lambda function may be applied.

19. A computer-readable storage device comprising executable instructions that, when executed by one or more processors, assists with interacting with lambda functions, the computer-readable storage device including instructions executable by the one or more processors for:

receiving an indication to store a lambda function, wherein the lambda function comprises:

a reference to a range of cells that includes a value that the lambda function is applied to in a first spreadsheet application instance, wherein the first spreadsheet application instance is a spreadsheet application instance in which the lambda function was created, information, executable by spreadsheet applications, that is generic to spreadsheet application instances, and metadata describing the functionality of the lambda function, automatically replacing the reference to the range of cells with a generic placeholder that is selectable for adding a range of cells from a separate spreadsheet application instance;

storing the lambda function;

receiving an indication to apply the stored lambda function to data in a separate spreadsheet application instance, wherein the separate spreadsheet application instance is a spreadsheet application instance in which the lambda function was not created;

providing the stored lambda function to the separate spreadsheet application instance receiving an indication of a selection of the generic placeholder in the separate spreadsheet application instance; and replacing the generic placeholder with a range of cells from the separate spreadsheet application instance.

20. The computer-readable storage device of claim 19, wherein the lambda function is an implied lambda function.

* * * * *